United States Patent
Shinjo et al.

(10) Patent No.: US 12,480,010 B2
(45) Date of Patent: Nov. 25, 2025

(54) AQUEOUS INKJET INK, AQUEOUS INKJET INK SET, AND INKJET RECORDING METHOD

(71) Applicant: CANON KABUSHIKI KAISHA, Tokyo (JP)

(72) Inventors: Kenji Shinjo, Kanagawa (JP); Yohei Kohashi, Kanagawa (JP); Tatsuaki Orihara, Tokyo (JP); Takeshi Okada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1043 days.

(21) Appl. No.: 17/494,863

(22) Filed: Oct. 6, 2021

(65) Prior Publication Data

US 2022/0112385 A1 Apr. 14, 2022

(30) Foreign Application Priority Data

Oct. 8, 2020 (JP) .................................. 2020-170534
Sep. 28, 2021 (JP) .................................. 2021-158231

(51) Int. Cl.
| | | |
|---|---|---|
| C09D 11/101 | (2014.01) | |
| B41J 11/00 | (2006.01) | |
| C08F 120/56 | (2006.01) | |
| C08K 5/07 | (2006.01) | |
| C08K 5/25 | (2006.01) | |
| C09D 11/107 | (2014.01) | |
| C09D 11/324 | (2014.01) | |
| C09D 11/38 | (2014.01) | |
| C09D 11/54 | (2014.01) | |

(52) U.S. Cl.
CPC ......... *C09D 11/101* (2013.01); *B41J 11/0021* (2021.01); *C08F 120/56* (2013.01); *C08K 5/07* (2013.01); *C08K 5/25* (2013.01); *C09D 11/107* (2013.01); *C09D 11/324* (2013.01); *C09D 11/38* (2013.01); *C09D 11/54* (2013.01)

(58) Field of Classification Search
CPC ... C09D 11/101; C09D 11/107; C09D 11/324; C09D 11/38; C09D 11/54; C08F 120/56; C08K 5/25
See application file for complete search history.

(56) References Cited

U.S. PATENT DOCUMENTS

| | | |
|---|---|---|
| 4,313,124 A | 1/1982 | Hara |
| 4,345,262 A | 8/1982 | Shirato et al. |

(Continued)

FOREIGN PATENT DOCUMENTS

| | | | | |
|---|---|---|---|---|
| CN | 110128875 A | * | 8/2019 | ............... C08F 2/24 |
| CN | 110684487 A | * | 1/2020 | .............. C09J 11/06 |

(Continued)

OTHER PUBLICATIONS

WO 2018168870 A1 machine translation (Year: 2018).*

(Continued)

*Primary Examiner* — Mark Eashoo
*Assistant Examiner* — Caitlin Norine Illing
(74) *Attorney, Agent, or Firm* — Venable LLP (57) ABSTRACT

An aqueous inkjet ink of the present disclosure is an active energy ray curable aqueous inkjet ink including a water-soluble monomer having a polymerizable group and a hydrazide compound. The water-soluble monomer is a curable substance having a ketone structure.

10 Claims, 2 Drawing Sheets

(56) References Cited

U.S. PATENT DOCUMENTS

| | | | |
|---|---|---|---|
| 4,459,600 | A | 7/1984 | Sato et al. |
| 4,463,359 | A | 7/1984 | Ayata et al. |
| 4,558,333 | A | 12/1985 | Sugitani et al. |
| 4,723,129 | A | 2/1988 | Endo et al. |
| 4,740,796 | A | 4/1988 | Endo et al. |
| 5,658,376 | A | 8/1997 | Noguchi et al. |
| 5,837,045 | A | 11/1998 | Johnson et al. |
| 5,851,280 | A | 12/1998 | Belmont et al. |
| 6,114,020 | A | 9/2000 | Misuda et al. |
| 6,354,698 | B1 | 3/2002 | Tachihara et al. |
| 6,391,440 | B1 | 5/2002 | Yoshino et al. |
| 6,612,688 | B2 | 9/2003 | Tachihara et al. |
| 6,670,000 | B1 | 12/2003 | Misuda et al. |
| 6,730,375 | B2 | 5/2004 | Moriya et al. |
| 6,783,229 | B1 | 8/2004 | Inamoto et al. |
| 6,811,839 | B2 | 11/2004 | Hiro et al. |
| 6,966,944 | B2 | 11/2005 | Shimomura et al. |
| 7,208,032 | B2 | 4/2007 | Hakamada et al. |
| 7,297,194 | B2 | 11/2007 | Shinjo et al. |
| 7,517,073 | B2 | 4/2009 | Nito et al. |
| 7,517,074 | B2 | 4/2009 | Hakamada et al. |
| 7,601,790 | B2 | 10/2009 | Sato et al. |
| 8,124,791 | B2 | 2/2012 | Shinjo et al. |
| 8,158,746 | B2 | 4/2012 | Shinjo |
| 8,408,690 | B2 | 4/2013 | Harada et al. |
| 8,690,306 | B2 | 4/2014 | Amao et al. |
| 8,905,534 | B2 | 12/2014 | Amao et al. |
| 8,940,373 | B1 | 1/2015 | Shinjo et al. |
| 9,051,484 | B2 | 6/2015 | Shinjo et al. |
| 9,598,589 | B2 | 3/2017 | Naruse et al. |
| 10,065,412 | B2 | 9/2018 | Shinjo et al. |
| 2002/0047877 | A1 | 4/2002 | Tachihara et al. |
| 2005/0287476 | A1* | 12/2005 | Ishikawa .............. C09D 11/101 430/281.1 |
| 2007/0211126 | A1* | 9/2007 | Bauer .................... C09D 11/40 347/100 |
| 2011/0104453 | A1 | 5/2011 | Shinjo et al. |
| 2012/0142847 | A1* | 6/2012 | Yang .................. C08G 59/4014 524/556 |
| 2012/0249700 | A1 | 10/2012 | Amao et al. |
| 2014/0077486 | A1 | 3/2014 | Naruse et al. |
| 2014/0132685 | A1 | 5/2014 | Amao et al. |
| 2015/0050426 | A1* | 2/2015 | Ito ............................. G03F 7/027 427/508 |
| 2017/0137644 | A1* | 5/2017 | Morita ................. C09D 11/107 |

FOREIGN PATENT DOCUMENTS

| | | | | |
|---|---|---|---|---|
| JP | S59-123670 | A | 7/1984 | |
| JP | H08-143802 | A | 6/1996 | |
| JP | H08-209048 | A | 8/1996 | |
| JP | H10-140065 | A | 5/1998 | |
| JP | H11-188870 | A | 7/1999 | |
| JP | 2962880 | B2 | 10/1999 | |
| JP | 3246949 | B2 | 1/2002 | |
| JP | 2012-214561 | A | 11/2012 | |
| JP | 2013-018846 | A | 1/2013 | |
| JP | 6015913 | B2 | 10/2016 | |
| WO | WO-2018168870 | A1 * | 9/2018 | ........... C07C 215/40 |
| WO | WO-2019065266 | A1 * | 4/2019 | ................ B41J 2/01 |

OTHER PUBLICATIONS

WO 2019065266 A1 machine translation (Year: 2019).*
Gantrade, FAQ: Diacetone Acrylamide, Archived Sep. 24, 2020, p. 1-8 (Year: 2020).*
CN110684487A machine translation (Year: 2020).*
CN110128875A machine translation (Year: 2019).*
JP 2962880 B2.*
JP 3246949 B2.*
JP 6015913 A, U.S. Pat. No. 9,598,589 B2.*
JP H08-143802 A.*
JP H08-209048 A, U.S. Pat. No. 9,598,589 B2.*
JP H10-140065 A.*
JP H11-188870 A, U.S. Pat. No. 6,354,698 B1.*
JP S59-123670 A.*
JP 2012-214561 A, U.S. Pat. No. 8,690,306 B2.*
JP 2013-018846 A, U.S. Pat. No. 8,905,534 B2.*
U.S. Pat. No. 5,837,045.*
U.S. Pat. No. 5,851,280.*
U.S. Pat. No. 4,723,129.*
U.S. Pat. No. 4,740,796.*
U.S. Pat. No. 4,463,359.*
U.S. Pat. No. 4,345,262.*
U.S. Pat. No. 4,313,124.*
U.S. Pat. No. 4,558,333.*
U.S. Pat. No. 4,459,600.*

* cited by examiner

AQUEOUS INKJET INK, AQUEOUS INKJET INK SET, AND INKJET RECORDING METHOD

BACKGROUND OF THE INVENTION

Field of the Invention

The present disclosure relates to an active energy ray curable aqueous inkjet ink, an aqueous inkjet ink set, and an inkjet recording method using these.

Description of the Related Art

Heretofore, an image recording method has been known which involves irradiating a liquid composition applied on a recording medium with an active energy ray to thereby cure a curable substance in the liquid composition and thus form a cured film. This method is categorized under, for example, a technique in which an image is recorded by applying a liquid composition (curable emulsion coating), which is created by adding a color material to an aqueous vehicle in which a non-aqueous active energy ray curable substance is emulsified and dispersed, on a medium and thereafter irradiating the medium with an ultraviolet ray.

Active energy ray curable liquid compositions and various coatings have been widely used in fields such as graphic art, sign art, display panel production, label recording, package recording, and electronic circuit board production. One of the most well-known techniques is to use a liquid composition containing an active energy ray curable substance as an ink in an inkjet recording method.

A non-aqueous or aqueous compound is used as a curable substance in an active energy ray curable ink to be applied in an inkjet recording method. The active energy ray curable inks using non-aqueous curable substances are roughly categorized into two types: one is a so-called oleaginous ink in which a pigment is dispersed in an organic solvent such as toluene and methyl ethyl ketone; and the other is a so-called 100% curable ink (non-solvent ink), which uses no organic solvent and contains a liquid monomer and oligomer and a pigment dispersion.

When an oleaginous ink is used, since an organic solvent is likely to be volatilized into the air, sufficient attention to the environment is required. Additionally, when a 100% curable ink is used, since all the components applied on a recording medium are formed into a cured film, a step (unevenness) is likely to be generated between a recorded portion and a non-recorded portion, and this makes it difficult to improve the gloss of the image. Accordingly, it is difficult to offer an active energy ray curable ink using a non-aqueous curable substance to applications that require high image quality.

On the other hand, in a case of an ink using an aqueous curable substance, since a water-based solvent containing water as a main component is used, burdens on the environment due to the volatilization of the solvent are considerably small. Additionally, since the unevenness is less likely to be generated on the image, it is possible to improve the gloss of the image. For these reasons, it is significantly effective to employ an active energy ray curable aqueous ink liquid composition using an aqueous curable substance in an inkjet recording method. Moreover, in addition to such an active energy ray curable aqueous ink, various water-soluble curable substances used therein have been examined.

Note that, for example, such water-soluble curable substances are required to have characteristics such as: having a high water-solubility before the substance is cured; not reducing the performance of the ink even with a color material; being stable under normal temperature condition; and not reducing the ejection quality of ink. Additionally, the water-soluble curable substances are also required to have characteristics such as: having a high sensibility to light of a predetermined wavelength; being capable of forming a cure film having excellent rub fastness; having a high resistance to various organic solvents and water; and being less likely to be yellowed and deteriorated under various environments.

There have been proposed various curable substances used for an active energy ray curable aqueous ink. For example, there has been proposed an ink using a water-soluble and photo-curable multifunctional acrylamide compound as a curable substance (Japanese Patent Application Laid-Open No. 2013-018846). Additionally, there has been proposed monofunctional acrylamide that is used in combination with the curable substance proposed in Japanese Patent Application Laid-Open No. 2013-018846 (Japanese Patent Application Laid-Open No. 2012-214561). On the other hand, there have been also examined various types of inks that are cured without using an active energy ray. For example, there has been proposed an ink containing a polymer that has an acrylamide structure and cross-linkable functional groups and can be cured by a cross-linking reaction (Japanese Patent No. 6015913).

SUMMARY OF THE INVENTION

The present disclosure is directed to provide an active energy ray curable aqueous inkjet ink whose ejection performance including ejection quality and standing stability is good and that is capable of forming a cured film whose characteristics such as rub fastness and water resistance are good. Additionally, the present disclosure is directed to provide an active energy ray curable aqueous inkjet ink set whose ejection performance including ejection quality and standing stability is good and that is capable of forming a cured film whose characteristics such as rub fastness and water resistance are good. Moreover, the present disclosure is directed to provide an inkjet recording method using each of the above-described aqueous inkjet ink and aqueous inkjet ink set.

According to an aspect of the present disclosure, an active energy ray curable aqueous inkjet ink including: a water-soluble monomer having a polymerizable group; and a hydrazide compound, in which the water-soluble monomer is a curable substance having a ketone structure is provided.

According to another aspect of the present disclosure, an aqueous inkjet ink set, including: a combination of an active energy ray curable first aqueous inkjet ink containing a water-soluble monomer having a polymerizable group and a second aqueous inkjet ink containing a hydrazide compound, in which the water-soluble monomer is a curable substance having a ketone structure is provided.

According to another aspect of the present disclosure, an inkjet recording method, including the steps of: form a first uncured image by ejecting and applying the above-mentioned aqueous inkjet ink from an inkjet type print head onto a recording medium; and forming an image by curing the first uncured image by an active energy ray curing reaction and a chemical cross-linking reaction is provided.

According to another aspect of the present disclosure, an inkjet recording method, including the steps of: forming a second uncured image by ejecting and applying each of the first aqueous inkjet ink and the second aqueous inkjet ink forming the above-mentioned aqueous inkjet ink set from an inkjet type print head onto a recording medium such that the first aqueous inkjet ink and the second aqueous inkjet ink are at least partially overlapped with each other; and forming an image by curing the second uncured image by an active energy ray curing reaction and a chemical cross-linking reaction is provided.

Further features of the present disclosure will become apparent from the following description of exemplary embodiments with reference to the attached drawings.

DESCRIPTION OF THE EMBODIMENTS

Since the curable substance proposed in Japanese Patent Application Laid-Open No. 2013-018846 is a multifunctional compound, there has been a problem that the cured film to be formed has an excessively high cross-linking density, and thus the cured film is more likely to be fragile. The characteristics of the cured film can be improved by using the acrylamide compound proposed in Japanese Patent Application Laid-Open No. 2012-214561, however, there has been a problem of reduction in the water resistance due to a low cross-linking density.

Additionally, even with the polymer proposed in Japanese Patent No. 6015913, there still has been a problem of reduction in the water resistance due to a small absolute amount of cross-linking components. Note that, in order to stably eject an ink containing a polymer by an inkjet method, the ink is required to contain solvent components. However, the solvent components are likely to affect the water resistance of the cured film to be formed, and thus it has been difficult to achieve both the ejection quality of the ink and characteristics of the cured film to be formed such as the water resistance.

Therefore, the present inventors have earnestly examined the provision of an active energy ray curable aqueous inkjet ink whose ejection performance including ejection quality and standing stability is good and that is capable of forming a cured film whose characteristics such as rub fastness and water resistance are good, and have arrived the present disclosure.

In the following, an aqueous inkjet ink, an aqueous inkjet ink set, and an inkjet recording method according to an embodiment of the present disclosure will be described.

The present disclosure will further be described below in detail through a preferred embodiment. Incidentally, the inkjet aqueous ink will also be referred to simply as "ink". Also, the inkjet aqueous ink set will be referred to simply as "ink set". Physical property values are values at normal temperature (25° C.) unless otherwise noted.

<Aqueous Inkjet Ink, Aqueous Inkjet Ink Set>

The ink of the present disclosure is an active energy ray curable aqueous inkjet ink containing a water-soluble monomer having a polymerizable group. Moreover, the ink of the present disclosure further contains a hydrazide compound, and the water-soluble monomer is a curable substance having a ketone structure. The water-soluble monomer is a curable substance that cures by a curing reaction with an active energy ray. Furthermore, the water-soluble monomer, since having the ketone structure in its molecular structure, is also a curable substance that cures by a chemical cross-linking reaction with the hydrazide compound. Thus, by using the ink of the present disclosure, it is possible to form a cured film (image) whose characteristics such as rub fastness and water resistance are good by proceeding both the active energy ray curing reaction and chemical cross-linking reaction while maintaining good ejection performance.

The ink set of the present disclosure includes a combination of an active energy ray curable first aqueous inkjet ink (first ink) containing a water-soluble monomer having a polymerizable group and a second aqueous inkjet ink (second ink) containing a hydrazide compound. Moreover, the water-soluble monomer is a curable substance having a ketone structure. The water-soluble monomer in the first ink is a curable substance that cures by a curing reaction with an active energy ray. Furthermore, the water-soluble monomer, since having the ketone structure in its molecular structure, is also a curable substance that cures by a chemical cross-linking reaction with the hydrazide compound in the second ink. Thus, by using the ink set of the present disclosure, it is possible to form a cured film (image) whose characteristics such as rub fastness and water resistance are good by proceeding both the active energy ray curing reaction and chemical cross-linking reaction while maintaining good ejection performance. Hereinafter, the ink of the present disclosure, and the first ink and the second ink forming the ink set of the present disclosure will also be referred to simply and collectively as "the ink", "the inks", or "each ink".

(Water-Soluble Monomer)

The water-soluble monomer is a curable substance having a polymerizable group and also having a ketone structure. The molecular weight of the water-soluble monomer is preferably 5,000 or less, more preferably 3,000 or less, and particularly preferably 1,000 or less. By using the water-soluble monomer with its molecular weight within the above range, it is possible to achieve both the good ejection performance and good cured film characteristics at a higher level. The curable substance as the water-soluble monomer is preferably an acrylamide-based compound. Moreover, the acrylamide-based compound is preferably at least one selected from the group consisting of diacetone acrylamide and diacetone methacrylamide. Note that, "water-soluble" herein represents a property of dissolving into water at 25° C. by 1% by mass or more.

The second ink forming the ink set may contain a curable substance having a ketone structure. The content of the curable substance having a ketone structure in each ink is preferably 5% by mass or more to 80% by mass or less and more preferably 10% by mass or more to 60% by mass or less relative to the total mass of the ink. By setting the content of the curable substance having a ketone structure in each ink within the above range, it is possible to further improve the ink ejection characteristics and the characteristics of the cured film to be formed.

In addition to the above-described curable substance having a ketone structure, it is possible to use a curable substance (another curable substance) other than the curable substance having a ketone structure. Examples of this other curable substance may include functional compounds having reactivity such as a surfactant, a cure promoter, a water-soluble aid, and a viscosity modifier. Specific examples of the other curable substance may include acry- loylmorpholine, N-vinylpyrrolidone, acrylamide, hydroxyethyl acrylamide, methylenebisacrylamide, mono-acrylic acid ester of oligoethylene oxide, mono-acrylic acid ester of diprotic acid, and the like. Further, commercially-available products of the other curable substance may include, hereinafter by their trade names, FOM-3008 (water-soluble bifunctional acrylamide), FOM-3007 (water-soluble trifunctional acrylamide), FOM-3006 (water-soluble tetrafunctional acrylamide), FOM-3009 (water-soluble tetrafunctional acrylamide) (all of which are manufactured by FUJIFILM Wako Pure Chemical Corporation), and the like.

If the content of the other curable substance in each ink is excessively large, the target effect to be achieved may be somewhat insufficient. For this reason, the content of the other curable substance in each ink is preferably 0.01 part by mass or more to 100 parts by mass or less relative to 100 parts by mass of the curable substance having a ketone structure. Moreover, the content is more preferably 0.1 part by mass or more to 75 parts by mass or less and particularly preferably 1 part by mass or more to 50 parts by mass or less.

(Polymerization Initiator)

A polymerization initiator can be contained in each ink. As the polymerization initiator, compounds that generate an active species which initiates the curing (polymerization) of the curable substance having a ketone structure by means of light are usable, for example. Among those, a polymerization initiator that generates a radical by means of light is preferably used since the curing reaction of the curable substance having a ketone structure progresses markedly with radical generation.

The polymerization initiator is preferably a compound having water-soluble groups. Examples of the water-soluble group may include a hydroxyl group, a carboxylic acid group, a sulfonic acid group, a phosphate group, a carboxylic acid base, a sulfonic acid base, a phosphate base, an ether group, and an amide group. When the ink contains a color material having anionic groups, a polymerization initiator having no ester groups is preferably used in order to suppress hydrolysis. Specific examples of the polymerization initiator may include the compounds represented by the following structural formulas (A) to (C) (polymerization initiators A to C). The polymerization initiator A is an example of an acylphosphine-based active energy ray polymerization initiator. The polymerization initiator B is an example of an α-hydroxyketone-based active energy ray polymerization initiator. Moreover, the polymerization initiator C is an example of a thioxanthone-based active energy ray polymerization initiator.

(A)

(B)

(C)

The content of the polymerization initiator in each ink is preferably 0.01% by mass or more to 20% by mass or less, more preferably 0.01% by mass or more to 10% by mass or less, and particularly preferably 0.01% by mass or more to 5% by mass or less relative to the total mass of the ink. If the amount of the polymerization initiator is excessively large, an unreacted portion of the polymerization initiator tends to remain in the cured film, which may somewhat lower the strength of the cured film.

It is possible to use a polymerization initiator and a sensitizer together and also use two or more kinds of polymerization initiators together. By using two or more kinds of polymerization initiators, light with a wavelength that cannot be effectively used only with one kind of polymerization initiator can be utilized. In this way, further radical generation is expected to be achieved. Note that, the polymerization initiator does not have to be contained in the case of employing an electron beam curing method using an electron beam as the active energy ray.

(Hydrazide Compound)

The hydrazide compound is a component functioning as a cross-linking agent that cures the curable substance having a ketone structure, which is a water-soluble monomer, by a chemical cross-linking reaction. The hydrazide compound is preferably a multifunctional hydrazide compound. Specific examples of the hydrazide compound may include carbohydrazide, oxalic acid dihydrazide, malonic acid dihydrazide, succinic acid dihydrazide, glutaric acid dihydrazide, adipic acid dihydrazide, pimelic acid dihydrazide, suberic acid dihydrazide, azelaic acid dihydrazide, sebacic acid dihydrazide, dodecanediohydrazide, hexadecanediohydrazide, terephthalic acid dihydrazide, isophthalic acid dihydrazide, 2,6-naphthoic acid dihydrazide, 4,4'-bisbenzene dihydrazide, 1,4-cyclohexane dihydrazide, tartaric acid dihydrazide, malic acid dihydrazide, iminodiacetic acid dihydrazide, N,N'-hexamethylenebissemicarbazide, itaconic acid dihydrazide, ethylenediamine tetraacetic acid tetrahydrazide, citric acid trihydrazide, butane tricarbohydrazide, 1,2,3-benzene trihydrazide, 1,4,5,8-naphthoic acid tetrahydrazide, nitriloacetic acid trihydrazide, cyclohexanetricarboxylic acid trihydrazide, pyromellitic acid tetrahydrazide, and polyacrylic hydrazide (i.e., N-aminopolyacrylamide), 1,3-bis(hydrazinocarboethyl)-54 sopropylhydantoin, and the like. Also, it is possible to use a multifunctional hydrazide derivative obtained by reacting these multifunctional hydrazide compounds with ketones such as acetone and methyl ethyl ketone. The hydrazide compound is preferably adipic acid dihydrazide in view of handleability and reactivity with a ketone structure (carbonyl groups).

The content of the hydrazide compound in the ink of the present disclosure and in the second ink forming the ink set of the present disclosure is preferably 0.5% by mass or more to 50% by mass or less and more preferably 1% by mass or more to 30% by mass or less relative to the total mass of the ink.

(Solvent)

Each ink is an aqueous ink containing water as its main solvent. The content of water in each ink is preferably 30% by mass or more and more preferably 50% by mass or more relative to the total mass of the ink.

Also, for the purpose of improving various kinds of performance, various organic solvents may further be contained to such an extent as not to impair the original characteristics. For example, a certain organic solvent can impart non-volatility to the ink. Also, various organic solvents can be contained in each ink for purposes such as adjusting the viscosity, adjusting the surface tension, and imparting wettability on a recording medium.

Examples of the organic solvents may include: glycol ethers such as ethylene glycol monomethyl ether, diethylene glycol monoethyl ether, triethylene glycol monomethyl ether, and propylene glycol monomethyl ether; monohydric alcohols such as methanol, ethanol, propanol, butanol, and pentanol; and the like.

The curable substance having a ketone structure may not be completely dissolved in a solvent such as water and may be contained in each ink in the state of emulsion in which the curable substance is emulsified and dispersed. An encapsulation technique may also be applied.

(Color Material)

Each ink can contain a color material. As the color material, a pigment and a dye can be used. The pigment may include magnetic fine particles such as magnetite and a ferrite and an inorganic pigment and an organic pigment such as titanium black and carbon black. Carbon black may include, for example, furnace black, lampblack, acetylene black, and channel black.

The organic pigment may include: an azo pigment such as tolidine red and hansa yellow; a phthalocyanine-based pigment such as phthalocyanine blue and phthalocyanine green; a quinacridone-based pigment such as quinacridone red and quinacridone magenta; a perylene-based pigment such as perylene red and perylene scarlet; an isoindolinone-based pigment such as isoindolinone yellow and isoindolinone orange; an imidazolone-based pigment such as benzimidazolone yellow and benzimidazolone orange; a pyranthrone-based pigment such as pyranthrone red and pyranthrone orange; and the like.

Color index (C.I.) numbers indicating an organic pigment may include: C.I. pigment yellow 12, 13, 14, 17, 20, 24, 55, 74, 83, 86, 93, 97, 98, 109, 110, 117, 120, 125, 128, 137, 138, 139, 147, 148, 150, 151, 153, 154, 155, 166, 168, 180, 185; C.I. pigment orange 16, 36, 43, 51, 55, 59, 61, 71; C.I. pigment red 9, 48, 49, 52, 53, 57, 97, 122, 123, 149, 168, 175, 176, 177, 180, 192, 202, 209, 215, 216, 217, 220, 223, 224, 226, 227, 228, 238, 240, 254, 255, 272; C.I. pigment violet 19, 23, 29, 30, 37, 40, 50; C.I. pigment blue 15, 15:1, 15:3, 15:4, 15:6, 22, 60, 64; C.I. pigment green 7, 36; C.I. pigment brown 23, 25, 26; and the like.

When a pigment is contained in each ink, a pigment dispersion in which the pigment is homogeneously dispersed in an aqueous medium is preferably used. As the pigment dispersion, a conventionally known pigment dispersion used for an aqueous gravure ink, a pigment dispersion liquid for aqueous writing materials, an ink for inkjet, and the like can be preferably used. Among those, a pigment dispersion in which a pigment is stably dispersed in an aqueous medium by means of an anionic group is preferable. The pigment dispersion in which a pigment is stably dispersed in an aqueous medium by means of an anionic group is disclosed in Japanese Patent Application Laid-Open Nos. H08-143802, H08-209048, and H10-140065, U.S. Pat. Nos. 5,837,045 and 5,851,280, and the like.

When a pigment is used, a dispersant may be used together. As the dispersant, a block polymer, a random polymer, a graft polymer, and the like may be used. A further specific dispersant may include a styrene-acrylic acid copolymer, a styrene-maleic acid copolymer, a vinylnaphthalene-acrylic acid copolymer, a vinylnaphthalene-maleic acid copolymer, a benzyl methacrylate-methacrylic acid copolymer, and salt of those. As the pigment, a so-called self dispersed pigment in which an ionic group is coupled with the particle surface and that can be dispersed in a medium without using a dispersant can be used.

Color index (C.I.) numbers indicating a dye may include: C.I. acid yellow 11, 17, 23, 25, 29, 42, 49, 61, 71; C.I. direct yellow 12, 24, 26, 44, 86, 87, 98, 100, 130, 132, 142; C.I. acid red 1, 6, 8, 32, 35, 37, 51, 52, 80, 85, 87, 92, 94, 115, 180, 254, 256, 289, 315, 317; C.I. direct red 1, 4, 13, 17, 23, 28, 31, 62, 79, 81, 83, 89, 227, 240, 242, 243; C.I. acid blue 9, 22, 40, 59, 93, 102, 104, 113, 117, 120, 167, 229, 234, 254; C.I. direct blue 6, 22, 25, 71, 78, 86, 90, 106, 199; C.I. direct black 7, 19, 51, 154, 174, 195; and the like.

Each ink can also be used as a so-called transparent ink, which substantially contains no color material. By means of the transparent ink, a cured film that is substantially colorless and transparent can be formed. Applications of such a transparent ink may include: an undercoat for imparting various aptitudes to a recording medium; a surface protection for an image recorded by a normal ink; an overcoat intended for imparting decoration and gloss; and the like, for example. Also, each ink can contain a colorless pigment and fine particles and the like that are not intended for coloring in the dispersed state depending on the use applications such as to prevent oxidation and color fading. Containing such a pigment and fine particles and the like makes it possible to improve some characteristics such as image quality, robustness, and workability (handleability).

(Other Matters)

Each ink can also be used as a so-called transparent ink, which substantially contains no color material. By means of the transparent ink, a cured film that is substantially colorless and transparent can be formed. Applications of such a transparent ink may include: an undercoat for imparting various aptitudes to a recording medium; a surface protection for an image recorded by a normal ink; an overcoat intended for imparting decoration and gloss; and the like, for example. Also, the ink can contain a colorless pigment and fine particles and the like that are not intended for coloring in the dispersed state depending on the use applications such as to prevent oxidation and color fading. Containing such a pigment and fine particles and the like makes it possible to improve some characteristics such as image quality, robustness, and workability (handleability).

Each ink is an aqueous ink for inkjet. One of the most preferable applications of the ink is to be used in an inkjet recording apparatus including a print head that ejects an ink by action of thermal energy. Moreover, each ink is also preferable as a liquid stored in a cartridge (liquid cartridge) including a liquid storage unit and as a liquid to be filled in the liquid cartridge.

<Inkjet Recording Method>

A first inkjet recording method of the present disclosure includes a step of forming a first uncured image by ejecting and applying the above-described aqueous inkjet ink from an inkjet type print head onto a recording medium. The first inkjet recording method further includes a step of forming an image, which is a cured film, by curing the first uncured image by an active energy ray curing reaction and a chemical cross-linking reaction.

A second inkjet recording method of the present disclosure includes a step of forming a second uncured image. In this step, each of a first aqueous inkjet ink and a second aqueous inkjet ink forming the above-described aqueous inkjet ink set are ejected from the inkjet type print head and applied on a recording medium such that at least a part of them are overlapped with each other. In this way, the second uncured image is formed. Additionally, the second inkjet recording method includes a step of forming an image, which is a cured film, by curing the second uncured image by an active energy ray curing reaction and a chemical cross-linking reaction.

As described above, each of the ink of the present disclosure and the first ink forming the ink set of the present disclosure contains a water-soluble monomer that is a curable substance cured by an active energy ray curing reaction by irradiation with an active energy ray and a chemical cross-linking reaction by means of a hydrazide compound. Therefore, by irradiating the first uncured image formed by using the ink of the present disclosure and the second uncured image formed by using the ink set of the present disclosure with an active energy ray, an active energy ray curing reaction and also a chemical cross-linking reaction can occur. By curing each of the first uncured image and the second uncured image in this way, an image that is a cured film whose cured film characteristics such as rub fastness and water resistance are good can be formed.

Both the step of forming the first uncured image and the step of forming the second uncured image can be performed according to the procedure of a conventional inkjet recording method. When these steps are performed, a conventional inkjet recording apparatus can be used.

Additionally, both the step of forming an image by curing the first uncured image and the step of forming an image by curing the second uncured image can be performed by using an inkjet recording apparatus including a unit emitting an active energy ray. An inkjet recording apparatus that can be used in the first inkjet recording method and the second inkjet recording method is described below.

<Inkjet Recording Apparatus>

The inkjet recording apparatus includes a print head ejecting an ink by an inkjet method. As the inkjet method, a method of ejecting an ink by applying thermal energy in which multi-orifice at high density of a print head can be easily implemented and an image of high resolution and high quality can be recorded is preferable.

As the print head of the type ejecting an ink by applying thermal energy, for example, a print head employing the basic principle disclosed in U.S. Pat. Nos. 4,723,129 and 4,740,796 is preferable. Such a method is applicable to both the so-called on-demand type and continuous type. In a case of the on-demand type, applying of at least one driving signal that corresponds to recording information and provides a rapid temperature increase exceeding nucleate boiling to electrothermal converters arranged corresponding to a sheet and a liquid channel holding the ink is preferable. It is effective because, in this way, thermal energy is generated in the electrothermal converters, and film boiling occurs on a surface of the print head on which heat affects; this results in formation of air bubbles in the ink corresponding to the driving signal one to one.

At least one droplet is formed by ejecting the ink from an ejection orifice by the growth and contraction of air bubbles. The driving signal is preferably in a pulse form since the ink can be ejected with particularly good responsiveness because air bubbles properly grow and contract immediately. The driving signal in a pulse form as described in U.S. Pat. Nos. 4,463,359 and 4,345,262 is preferable. Note that, conditions on the rate of increase in temperature on the surface on which heat affects described in U.S. Pat. No. 4,313,124 are preferably employed.

A preferable configuration of the print head is a configuration in which an ejection orifice, a liquid channel, and an electrothermal converter are combined with each other (linear liquid flow channel or orthogonal liquid flow channel) as disclosed in the above-mentioned specifications. In addition to the above, a configuration in which a portion on which heat affects is arranged in a bending region, which is disclosed in U.S. Pat. Nos. 4,558,333 and 4,459,600, is also preferable. Moreover, an air communication type ejection method described in Japanese Patent Nos. 2962880 and 3246949 and Japanese Patent Application Laid-Open No. H11-188870 is also effective. Furthermore, a configuration in which an ejection hole shared by multiple electrothermal converters is used as an ejection unit of the electrothermal converters (Japanese Patent Application Laid-Open No. S59-123670 and the like) is also effective.

As a full line type print head having a length corresponding to the width of the largest recording medium that the recording apparatus can record, the following configurations can be used. For example, any of the configurations disclosed in the above-mentioned specifications, which are a configuration in which the length is satisfied by combining multiple print heads and a configuration as a single print head that is integrally formed, may be used. Additionally, a replaceable chip type print head that enables electric connection with an apparatus main body and supplying of ink from the apparatus main body by being mounted on the recording apparatus and a cartridge type print head integrally provided with the print head are also effective.

Also, a recovery unit and a spare auxiliary unit for the print head are preferably added. Specifically, a capping unit for the print head, a cleaning unit, a pressurizing or suction unit, an electrothermal converter, a heating element, a spare heating unit, a spare ejection mode, and the like may be added.

Figure 1:
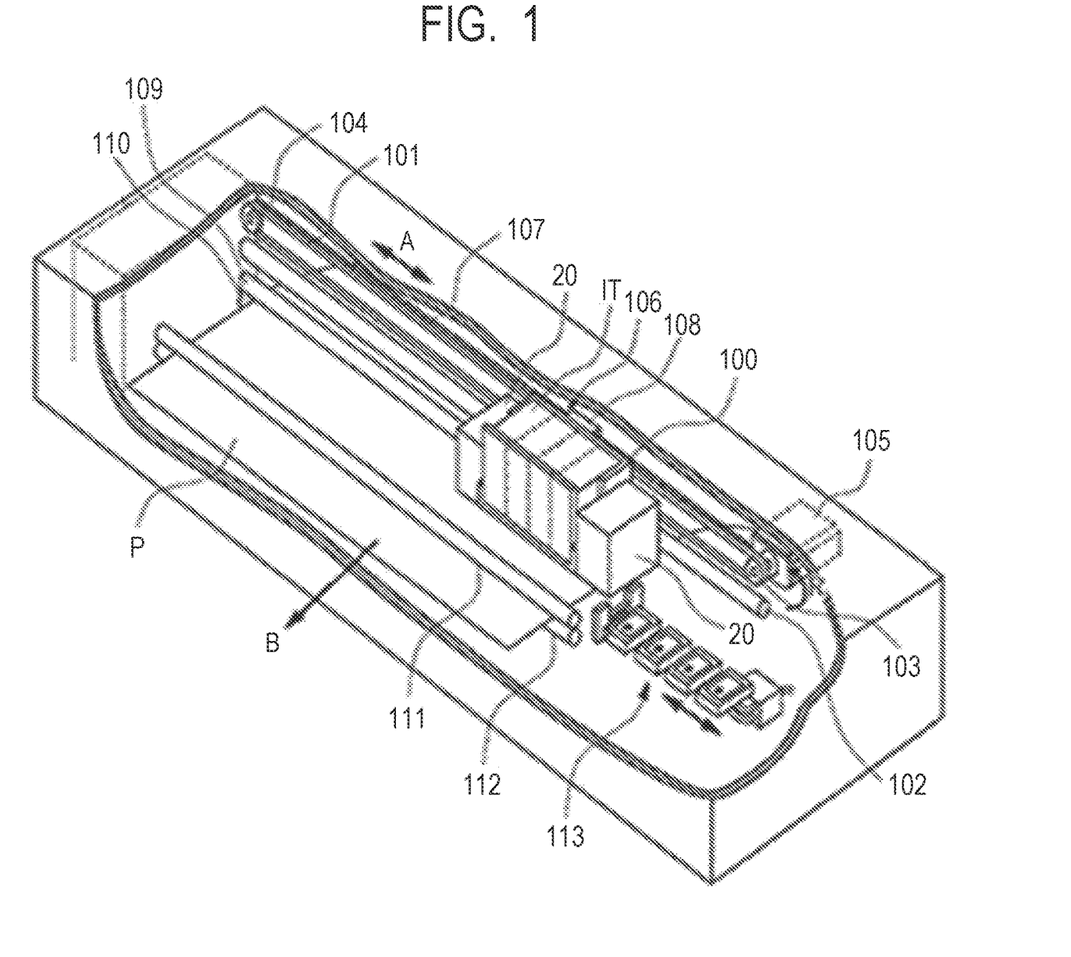
FIG. 1 is a perspective view schematically illustrating an example of the configuration of an inkjet recording apparatus.

FIG. 1 is a perspective view schematically illustrating an example of the configuration of an inkjet recording apparatus. The inkjet recording apparatus illustrated in FIG. 1 is a recording apparatus employing a shuttle method in which a short length serial head is used and recording is performed by scanning the head in a width direction of a recording medium. A carriage 100 is coupled to an endless belt 101 and is movable along a guide shaft 102. The endless belt 101 is tensioned between pulleys 103 and 104. The pulley 103 is coupled with a driving shaft of a motor 105. With this, the rotational driving of the motor 105 allows the carriage 100 to reciprocate in a main scanning direction indicated by an arrow A along the guide shaft.

On the carriage 100, a print head (not illustrated) in which multiple ink ejection nozzles are aligned and an ink tank IT as a container storing the inks are mounted. An active energy ray irradiation unit 20 is provided in at least one end of the carriage 100 in the main scanning direction A. Therefore, immediately after the ink is applied on a recording medium, the active energy ray irradiation unit 20 can irradiate a recording surface with an active energy ray. The active energy ray may include an electron beam, an ultraviolet ray, α ray, β ray, γ ray, X ray, and the like. Among those, an ultraviolet ray is preferable.

In the print head, multiple ink ejection orifices aligned in a conveying direction (sub scanning direction indicated by arrow B) of paper P as a recording medium are formed in an ejection orifice surface facing the paper P. In the print head, an ink channel communicating with each of the multiple ejection orifices is provided. Corresponding to each ink channel, an electrothermal converter that generates thermal energy to eject the ink is provided.

The electrothermal converter generates heat with an electric pulse according to driving data applied thereto and generates film boiling in the ink with the heat such that the ink is ejected from the ejection orifice with the generation of air bubbles. The ink channels communicate with a common liquid chamber that is shared by the ink channels, and the common liquid chamber is connected to the ink tank IT.

In the inkjet recording apparatus illustrated in FIG. 1, a linear encoder 106 detecting a moving position of the carriage 100 is provided. That is, in a linear scale 107 provided along a moving direction of the carriage 100, for example, 1,200 slits are formed at regular intervals within one inch. On the other hand, on the carriage 100 side, for example, a slit detection system 108 including a light emission unit and a light reception sensor and a signal processing circuit are provided. Therefore, according to the movement of the carriage 100 the linear encoder 106 outputs an ejection timing signal indicating an ink ejection timing and information on the moving position of the carriage 100. With the ink being ejected every time the slit in the linear scale 107 is detected, an image of resolution of 1,200 dpi can be recorded in the main scanning direction.

The paper P as a recording medium is intermittently conveyed in the sub scanning direction indicated by arrow B, which is orthogonal to an operation direction of the carriage 100. The paper P is supported by a pair of roller units 109 and 110 upstream in the conveying direction and a pair of roller units 111 and 112 downstream in the conveying direction. A certain tension is applied to the paper P, and the paper P is conveyed while the planarity with respect to a print head 10 is secured. Driving force to the roller units 111 and 112 is supplied from a non-illustrated paper conveying motor.

In the inkjet recording apparatus illustrated in FIG. 1, an image can be recorded on the entire paper P by repeating recoding of a width corresponding to the width in which the ejection orifices of the print head are aligned and conveying of the paper P while moving the carriage 100. The carriage 100 stops in a home position as needed when the recording is started or during the recording. In this home position, a cap member 113 capping the ejection surface side of each print head is provided. A suction recovery unit (not illustrated) for forcibly sucking the ink from the ejection orifices to prevent clogging of the ejection orifices is connected to this cap member 113.

In addition to the above-described shuttle method, there is a line method using a line head in which recording elements are aligned corresponding to an entire region in one side of a recording medium. In the line method, the image recording can be performed on the entire surface of a recording medium by scanning the recording medium in a direction in which the recording elements are aligned and a direction orthogonal thereto. For this reason, a conveying system such as a carriage scanning on a short length head is unnecessary. Also, complicated scanning control between the movement of a carriage and a recording medium is unnecessary, and only the recording medium is moved; thus, the recording speed can be increased more than in the shuttle method.

According to the present disclosure, it is possible to provide an active energy ray curable aqueous inkjet ink whose ejection performance including ejection quality and standing stability is good and that is capable of forming a cured film whose characteristics such as rub fastness and water resistance are good. Additionally, according to the present disclosure, it is possible to provide an active energy ray curable aqueous inkjet ink set whose ejection performance including ejection quality and standing stability is good and that is capable of forming a cured film whose characteristics such as rub fastness and water resistance are good. Moreover, it is possible to provide an inkjet recording method using each of the above-described aqueous inkjet ink and aqueous inkjet ink set.

EXAMPLES

Hereinafter, the present disclosure will be described in more detail based on examples and comparative examples. However, the present disclosure is by no means limited to the following examples as long as the gist thereof is not exceeded. The amounts of components represented by "part(s)" and "%" are based on mass, unless otherwise noted.

<Production of Ink (1)>

(Ink 1)

A pigment (C.I. pigment red 122) and a dispersant (a random copolymer of styrene/acrylic acid/ethyl acrylate, weight-average molecular weight=3,500, acid value=150 mgKOH/g) were mixed with each other and thereafter dispersed and processed by a bead mill. In this way, a magenta pigment dispersion in which a pigment solid content is 10% and pigment:dispersant (mass ratio)=3:1 was obtained. Subsequently, the following components were mixed and sufficiently agitated with each other and thereafter pressurized and filtered with a filter of a pore size of 0.5 μm; thus, an ink 1 was obtained. The thus-obtained ink 1 had nine pH. Among the following components, "Acetylenol E100" is a trade name of a non-ionic surfactant (ethylene oxide adduct of acetylene glycol) produced by Kawaken Fine Chemicals Co., Ltd. "FOM-3006" is a trade name of a curable substance (water-soluble tetrafunctional acrylamide) produced by FUJIFILM Wako Pure Chemical Corporation.

[Constitution of Ink 1]

| | |
|---|---|
| magenta pigment dispersion | 40% |
| diacetone acrylamide | 10% |
| FOM-3006 | 5% |
| polymerization initiator A | 2% |
| adipic acid dihydrazide | 1% |
| Acetylenol E100 | 1% |
| triethanolamine | 0.5% |
| ion-exchanged water | 40.5% |

(Ink 6)

An ink 6 was prepared similarly to the above-described ink 1 was except that the same amount of ion-exchanged water as adipic acid dihydrazide was used instead.

(Ink 10)

An ink 10 was prepared similarly to the above-described ink 1 was except that the same amount of polycarbodiimide compound (trade name: carbodilite SV-02, produced by Nisshinbo chemical Inc.) as adipic acid dihydrazide was used instead.

(Inks 2, 3, 7, 11)

Inks 2, 3, 7, and 11 were prepared similarly to the above-described ink 1 was except that the inks 2, 3, 7, and 11 have the following constitutions, respectively. Among the following components, "FOM-3008" is a trade name of a curable substance (water-soluble bifunctional acrylamide) produced by FUJIFILM Wako Pure Chemical Corporation.

[Constitution of Ink 2]

| | |
|---|---|
| magenta pigment dispersion | 40% |
| diacetone acrylamide | 25% |
| FOM-3008 | 5% |
| polymerization initiator A | 3% |
| Acetylenol E100 | 1% |
| ion-exchanged water | 26% |

[Constitution of Ink 3]

| | |
|---|---|
| FOM-3008 | 20% |
| polymerization photoinitiator A | 2% |
| adipic acid dihydrazide | 6% |
| carbohydrazide | 14% |
| Acetylenol E100 | 1% |
| ion-exchanged water | 57% |

[Constitution of Ink 7]

| | |
|---|---|
| FOM-3008 | 20% |
| polymerization initiator A | 2% |
| Acetylenol E100 | 1% |
| ion-exchanged water | 77% |

[Constitution of Ink 11]

| | |
|---|---|
| FOM-3008 | 20% |
| polymerization initiator A | 2% |
| magnesium nitrate | 15% |
| Acetylenol E100 | 1% |
| ion-exchanged water | 62% |

<Recording of Image (Formation of Cured Film) (1)>

Figure 2:
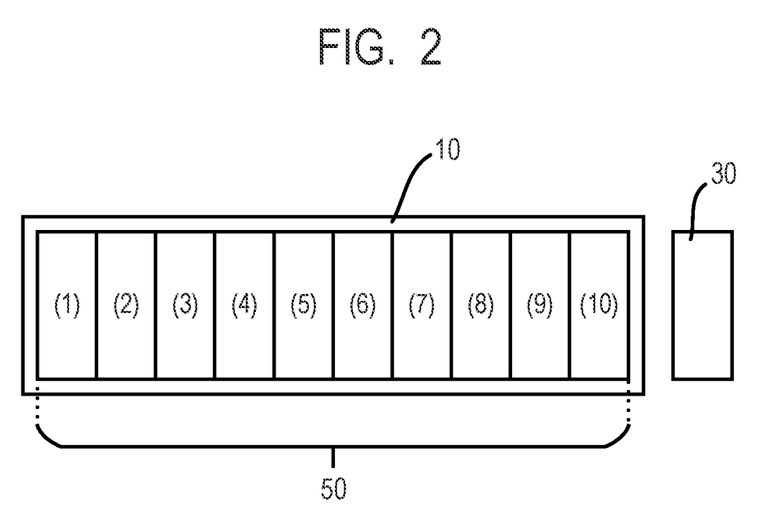
FIG. 2 is a schematic diagram illustrating a positional relationship between positions at which ink cartridges are mounted in a print head and a position of a UV-LED irradiation device.

Prepared was an on-demand type recording apparatus (trade name "Pro-10", produced by Canon Inc.) that ejects an ink by applying thermal energy according to a recording signal to the ink. The recording apparatus in which a UV-LED irradiation device (trade name "M30", produced by Ushio Inc., 395 nm) is mounted in a portion adjacent to a print head thereof was used as an inkjet recording apparatus. Specifically, as illustrated in FIG. 2, a UV-LED irradiation device 30 was mounted in a position adjacent to a mounting position (10) (GY cartridge mounting position) in an ink cartridge mounting position 50 of the print head 10. The integrated irradiation energy of an active energy ray (ultraviolet ray) under the drawing condition of one path in one direction was 2,000 mJ/cm$^2$. In this inkjet recording apparatus, an image that is recorded under the conditions that the resolution is 600 dpi×600 dpi and eight drops of 3.8 ng of ink are applied on a unit region of $\frac{1}{600}$ inch×$\frac{1}{600}$ inch is defined to satisfy 100% of the recording duty. This inkjet recording apparatus was used to record an image onto a PET film (trade name "easy adhesive white PET", produced by Teijin Limited).

Example 1

An ink cartridge filled with the ink 1 was mounted in a mounting position (3) (Y cartridge mounting position) illustrated in FIG. 2. A solid image of 1,200 dpi, 100% of duty was recorded in one path (drawing condition 1), and thereafter, subsequently the UV irradiation was performed to record an image (cured film).

Comparative Example 1

An image (cured film) was recorded similarly to the above-described example 1 except that the ink 6 was used instead of the ink 1.

Comparative Example 2

An image (cured film) was recorded similarly to the above-described example 1 except that the ink 10 was used instead of the ink 1.

Example 2

An ink cartridge filled with the ink 2 was mounted in the mounting position (3) (Y cartridge mounting position) illustrated in FIG. 2. Also, an ink cartridge filled with the ink 3 was mounted in a mounting position (6) (PBK cartridge mounting position) illustrated in FIG. 2. The ink 2 was ejected from the cartridge in the mounting position (3) with an ejection amount of 90% of duty (one path), and subsequently the ink 3 was ejected from the cartridge in the mounting position (6) with an ejection amount of 10% of duty (one path). In this way, a solid image of 1,200 dpi, 100% of duty was recorded (drawing condition 2). Then, subsequently the UV irradiation was performed, and an image (cured film) was recorded. Note that, the ratio (mass ratio) of the curable substance having a ketone structure and the hydrazide compound was curable substance:hydrazide compound=22.5:2.

Example 3

An image (cured film) was recorded similarly to the above-described example 2 except that the ejection amount from the cartridge in the mounting position (3) was set to 80% of duty while the ejection amount from the cartridge in the mounting position (6) was set to 20% of duty. Note that, the ratio (mass ratio) of the curable substance having a ketone structure and the hydrazide compound was curable substance:hydrazide compound=5:1.

Comparative Example 3

An image (cured film) was recorded similarly to the above-described example 2 except that the ink 7 was used instead of the ink 3.

Comparative Example 4

An image (cured film) was recorded similarly to the above-described example 2 except that the ink 11 was used instead of the ink 3.

Example 4

The ink cartridge filled with the ink 3 was mounted in the mounting position (3) (Y cartridge mounting position) illustrated in FIG. 2. Also, the ink cartridge filled with the ink 2 was mounted in the mounting position (6) (PBK cartridge mounting position) illustrated in FIG. 2.

The ink 3 was ejected from the cartridge in the mounting position (3) with an ejection amount of 20% of duty (one path), and subsequently the ink 2 was ejected from the cartridge in the mounting position (6) with an ejection amount of 80% of duty (one path). In this way, a solid image of 1,200 dpi, 100% of duty was recorded (drawing condition 3). Then, subsequently the UV irradiation was performed, and an image (cured film) was recorded.

<Production of Ink (2)>
(Inks 8 and 9)

Inks 8 and 9 were prepared according to the following procedure with reference to a method described in "Example 1" in Japanese Patent No. 6015913.

[Synthesis of Comparative Compound 1]

There were 30 parts of diacetone acrylamide (diacetone acrylamide), 70 parts of methacrylic acid, and 50 parts of ethanol put into a flask provided with an agitator, a thermometer, a dripping funnel, and a reflux condenser, the inside of the system was nitrogen substituted, and thereafter the temperature in the system was increased to 80° C. Polymerization was started by adding 0.5 parts of 2,2'-azoisobutylronitrile with the dripping funnel, and the polymerization was performed for six hours. After the polymerization, ethanol vapor was blown therein, and a 50% ethanol solution of a diacetone acrylamide-methacrylic acid copolymer was thus obtained. The thus-obtained solution was cleaned with ethanol and then dried, and thus a diacetone acrylamide-methacrylic acid copolymer (comparative compound 1, diacetone acrylamide:methacrylic acid=30:70) was obtained. Distilled water was added and also sodium hydroxide was added, and thus a 20% water solution (pH7) of the comparative compound 1 was obtained.

[Production of Pigment Dispersion]

A magenta pigment dispersion in which a pigment solid content is 10% and pigment:dispersant (mass ratio)=3:1 was obtained similarly to the above-described case of the ink 1 except that the comparative compound 1 was used as dispersed resin. Additionally, the inks 8 and 9 were prepared similarly to the above-described ink 1 was except that the thus-obtained magenta pigment dispersion liquid was used and the constitutions were set as follows.

[Constitution of Ink 8]

| magenta pigment dispersion | 40% |
|---|---|
| glycerin | 20% |
| Acetylenol E-100 | 1% |
| ion-exchanged water | 39% |

[Constitution of Ink 9]

| magenta pigment dispersion | 40% |
|---|---|
| glycerin | 5.5% |
| Acetylenol E-100 | 1% |
| ion-exchanged water | 53.5% |

<Recording of Image (Formation of Cured Film) (2)>

Comparative Example 5

An image (cured film) was recorded similarly to the above-described example 1 except that the ink 8 was used instead of the ink 1 and the UV irradiation was not performed.

Comparative Example 6

An image (cured film) was recorded similarly to the above-described example 1 except that the ink 9 was used instead of the ink 1 and the UV irradiation was not performed.

<Production of Ink (3)>
(Inks 4 and 5)

A black pigment dispersion in which a pigment solid content is 10% was obtained similarly to the above-described case of the ink 1 except that carbon black was used as the pigment instead of C.I. pigment red 122. Additionally, inks 4 and 5 were prepared similarly to the above-described ink 1 was except that the thus-obtained black pigment dispersion liquid was used and the constitutions were set as follows.

[Constitution of Ink 4]

| black pigment dispersion | 30% |
|---|---|
| diacetone acrylamide | 25% |
| FOM-3008 | 5% |
| polymerization initiator A | 5% |
| Acetylenol E100 | 1% |
| ion-exchanged water | 34% |

[Constitution of Ink 5]

| hydroxyethyl acrylamide | 15% |
|---|---|
| diacetone acrylamide | 10% |
| methylenebis acrylamide | 5% |
| polymerization photoinitiator A | 3% |
| adipic acid dihydrazide | 2% |
| Acetylenol E100 | 1% |
| ion-exchanged water | 64% |

<Recording of Image (Formation of Cured Film) (3)>

Example 5

An ink cartridge filled with the ink 4 was mounted in the mounting position (3) (Y cartridge mounting position) illustrated in FIG. 2. Also, an ink cartridge filled with the ink 5 was mounted in the mounting position (6) (PBK cartridge mounting position) illustrated in FIG. 2.

The ink 4 was ejected from the cartridge in the mounting position (3) with an ejection amount of 100% of duty (one path) to record a solid image, and thereafter, subsequently the UV irradiation was performed. Then, the ink 5 was ejected from the cartridge in the mounting position (6) with an ejection amount of 100% of duty (one path), and thereafter, subsequently the UV irradiation was performed, and thus an image (cured film) was recorded. Note that, the ratio (mass ratio) of the curable substance having a ketone structure and the hydrazide compound was curable substance:hydrazide compound=35:2.

<Evaluation>
(1) Ejection Performance
(Basic Ejection Quality)

The ink cartridges filled with the inks, respectively, were mounted in the inkjet recording apparatus. The sucking and restoring operation was performed, and after standing them for one minute, a solid image of 1,200 dpi, 100% of duty was recorded in one path. The condition of the thus-recorded solid image was checked visually, and the basic ejection quality was evaluated according to the following evaluation criteria. Table 1 shows the result.

A: Uniform solid image is obtained.
B: Less than 10% of printing starting portion is faint.
C: 10% or more to less than 20% of printing starting portion is faint.
D: 20% or more of printing starting portion is faint.

(Standing Stability)

The ink cartridges filled with the inks, respectively, were mounted in the inkjet recording apparatus. The sucking and restoring operation was performed, and after standing them for three days, a solid image of 1,200 dpi, 100% of duty was recorded in one path. The condition of the thus-recorded solid image was checked visually, and the standing stability was evaluated according to the following evaluation criteria. Table 1 shows the result.

A: Area of completely clean region is 90% or more of area of lens cleaning paper.

B: Area of completely clean region is 70% or more of area of lens cleaning paper.

C: Area of completely clean region is 50% or more of area of lens cleaning paper.

D: Area of completely clean region is less than 20% of area of lens cleaning paper.

TABLE 1

| | | Ink Cartridge | | Ejection Performance | | Cured Film Characteristics | |
| | | Mounting | | Basic | | | |
| | Ink | Position (FIG. 2) | UV Irradiation | Ejection Quality | Standing Stability | Rub Fastness | Water Resistance |
|---|---|---|---|---|---|---|---|
| Example 1 | INK 1 | (3) | Performed | B | B | A | A |
| Example 2 | INK 2 | (3) | Performed | A | A | A | A |
| | INK 3 | (6) | | A | A | | |
| Example 3 | INK 2 | (3) | Performed | A | A | A | A |
| | INK 3 | (6) | | A | A | | |
| Example 4 | INK 3 | (3) | Performed | A | A | A | A |
| | INK 2 | (6) | | A | A | | |
| Example 5 | INK 4 | (3) | Performed | A | A | A | A |
| | INK 5 | (6) | | A | A | | |
| Comparative Example 1 | INK 6 | (3) | Performed | B | B | C | D |
| Comparative Example 2 | INK 10 | (3) | Performed | B | B | C | D |
| Comparative Example 3 | INK 2 | (3) | Performed | A | A | A | C |
| | INK 7 | (6) | | A | A | | |
| Comparative Example 4 | INK 2 | (3) | Performed | A | A | B | C |
| | INK 11 | (6) | | A | A | | |
| Comparative Example 5 | INK 8 | (3) | Not Performed | A | A | D | D |
| Comparative Example 6 | INK 9 | (3) | Not Performed | C | D | D | D |

A: Uniform solid image is obtained.

B: Less than 10% of printing starting portion is faint.

C: 10% or more to less than 20% of printing starting portion is faint.

D: 20% or more of printing starting portion is faint.

(2) Cured Film Characteristics

[Evaluation of Rub Fastness]

One day after an image (cured film) was formed, the pencil hardness test compliant with JIS K 5600-5-4: 1999 was performed, and the rub fastness of the cured film was evaluated according to the following evaluation criteria. Table 1 shows the result.

A: No scrape and chip are found with pencil hardness of 2H.

B: No scrape and flake are found with pencil hardness of H or less.

C: No scrape and flake are found with pencil hardness of HB or less to B or more.

D: No scrape and flake are found with pencil hardness of 2B or less.

(Water Resistance)

One day after an image (cured film) was formed, 0.2 mL of ion-exchanged water was dropped on the cured film, and lens cleaning paper was placed thereon one minute later. The lens cleaning paper was pulled while applying a load of 40 g/cm$^2$, and thereafter a non-recorded portion (blank portion) and the lens cleaning paper were observed visually to evaluate the water resistance of the cured film according to the following evaluation criteria. Table 1 shows the result.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-170534, filed Oct. 8, 2020, and Japanese Patent Application No. 2021-158231, filed Sep. 28, 2021, which are hereby incorporated by reference herein in their entirety.

What is claimed is:

1. An active energy ray curable aqueous inkjet ink comprising:
    a water-soluble monomer having a polymerizable group; and
    a hydrazide compound, wherein
    the water-soluble monomer is a curable substance having a ketone structure,
    the curable substance is an acrylamide-based compound, and
    the hydrazide compound is adipic acid dihydrazide or carbohydrazide.

2. The aqueous inkjet ink according to claim 1, wherein the acrylamide-based compound is at least one selected from the group consisting of diacetone acrylamide and diacetone methacrylamide.

3. An aqueous inkjet ink set, comprising:
    a combination of an active energy ray curable first aqueous inkjet ink containing a water-soluble monomer having a polymerizable group and a second aqueous inkjet ink containing a hydrazide compound, wherein the water-soluble monomer is a curable substance having a ketone structure, the curable substance is an acrylamide-based compound, and the hydrazide compound is adipic acid dihydrazide or carbohydrazide.

4. The aqueous inkjet ink set according to claim 3, wherein the acrylamide-based compound is at least one selected from the group consisting of diacetone acrylamide and diacetone methacrylamide.

5. The aqueous inkjet ink according to claim 1, wherein the hydrazide compound is adipic acid dihydrazide.

6. The aqueous inkjet ink according to claim 1, wherein the molecular weight of the water-soluble monomer is 1,000 or less.

7. The aqueous inkjet ink according to claim 1, comprising a polymerization initiator, wherein the content of the polymerization initiator in the ink is 0.01% by mass or more to 5% by mass or less relative to the total mass of the ink.

8. The aqueous inkjet ink set according to claim 3, wherein the hydrazide compound is adipic acid dihydrazide.

9. The aqueous inkjet ink set according to claim 3, wherein the molecular weight of the water-soluble monomer is 1,000 or less.

10. The aqueous inkjet ink set according to claim 3, wherein at least one selected from the group of the first aqueous inkjet ink and the second aqueous inkjet ink contains a polymerization initiator, and the content of the polymerization initiator in the ink is 0.01% by mass or more to 5% by mass or less relative to the total mass of the ink.

* * * * *